(12) United States Patent
Brennan (10) Patent No.: US 10,602,879 B2
(45) Date of Patent: Mar. 31, 2020

(54) TOP VENT ASSEMBLY FOR KAMADO GRILL

(71) Applicant: Premier Specialty Brands LLC, Duluth, GA (US)

(72) Inventor: Robert A. Brennan, Duluth, GA (US)

(73) Assignee: Premier Specialty Brands, LLC, Duluth, GA (US)

( * ) Notice: Subject to any disclaimer, the term of this patent is extended or adjusted under 35 U.S.C. 154(b) by 264 days.

(21) Appl. No.: 15/390,137

(22) Filed: Dec. 23, 2016

(65) Prior Publication Data
US 2018/0177336 A1 Jun. 28, 2018

(51) Int. Cl.
*A47J 37/07* (2006.01)
*F24B 1/189* (2006.01)

(52) U.S. Cl.
CPC ........ *A47J 37/0786* (2013.01); *A47J 37/0704* (2013.01); *F24B 1/1895* (2013.01)

(58) Field of Classification Search
USPC ................ 454/5, 6, 30; 126/312, 80, 25 R
See application file for complete search history.

(56) References Cited

U.S. PATENT DOCUMENTS

| | | | | |
|---|---|---|---|---|
| 38,370 A * | 5/1863 | Boynton | ................. | F23J 13/00 |
| | | | | 126/312 |
| 232,166 A * | 9/1880 | Bales | ....................... | F24F 7/00 |
| | | | | 454/274 |
| 313,809 A * | 3/1885 | Combs | ..................... | F23J 13/00 |
| | | | | 126/312 |
| 1,059,221 A * | 4/1913 | Saylor | .................... | B65D 51/28 |
| | | | | 16/253 |
| 2,030,205 A * | 2/1936 | Green | ..................... | F23L 17/02 |
| | | | | 126/307 A |
| 3,276,440 A * | 10/1966 | Sazegar | .............. | A47J 37/0704 |
| | | | | 126/25 A |
| 3,556,078 A * | 1/1971 | McGaughey | ....... | A47J 37/0786 |
| | | | | 126/25 R |
| 4,232,595 A * | 11/1980 | Cox | ........................ | F23L 17/02 |
| | | | | 110/184 |
| 4,924,845 A * | 5/1990 | Johnson | .............. | A47J 37/0635 |
| | | | | 126/25 R |
| 4,957,039 A * | 9/1990 | Reyes | ................. | A47J 37/0704 |
| | | | | 126/25 R |
| 5,404,801 A * | 4/1995 | Holland | .............. | A47J 37/0786 |
| | | | | 126/25 R |
| 5,669,373 A * | 9/1997 | Gulddal | .................. | F23L 13/00 |
| | | | | 126/112 |
| 5,732,692 A * | 3/1998 | Schimmeyer | ........... | F23L 13/00 |
| | | | | 126/285 A |
| 6,606,986 B2 * | 8/2003 | Holland | .............. | A47J 37/0704 |
| | | | | 126/25 R |

(Continued)

*Primary Examiner* — Gregory L Huson
*Assistant Examiner* — Frances F. Hamilton
(74) *Attorney, Agent, or Firm* — Miller & Martin PLLC (57) ABSTRACT

A vent assembly that increases air flow and temperature control for outdoor cooking/smoking appliances, which effectively controls the space/gap for air exit, so as to improve air flow through the chimney and to increase temperature ranges and control within the smoker/chimney. The vent may have a gasket to make the grill waterproof and prevent mold when the grill is not in use. The vent can pivot or slide in one direction to ensure it does not open completely, so as to lose the air flow setting when the grill cover is opened or tilted.

17 Claims, 5 Drawing Sheets

(56) References Cited

U.S. PATENT DOCUMENTS

| | | | | |
|---|---|---|---|---|
| 6,718,966 B1* | 4/2004 | Barbour | ............... | A47J 27/12 |
| | | | | 126/25 R |
| 7,470,178 B2* | 12/2008 | Tajiri | ............... | B60H 1/00685 |
| | | | | 454/155 |
| 7,861,705 B2* | 1/2011 | Hulsey | ............... | A47J 37/07 |
| | | | | 126/25 A |
| 7,984,709 B1* | 7/2011 | Byrnes | ............... | A47J 37/0704 |
| | | | | 126/25 R |
| D689,738 S * | 9/2013 | Hobbs | ............... | D7/402 |
| 8,739,380 B1* | 6/2014 | Montgomery | ...... | A47J 37/0704 |
| | | | | 126/25 A |
| 9,028,309 B2* | 5/2015 | Rimmer | ............... | F24F 13/06 |
| | | | | 454/289 |
| 9,237,828 B2* | 1/2016 | Walters | ............... | A47J 37/0704 |
| 9,392,905 B2* | 7/2016 | Merritt | ............... | A47J 36/38 |
| 9,427,107 B2* | 8/2016 | Reinhart | ............... | F24B 1/1895 |
| D780,302 S * | 2/2017 | Merritt | ............... | D23/374 |
| 9,615,693 B1* | 4/2017 | Merritt | ............... | A47J 37/0786 |
| 10,010,219 B1* | 7/2018 | Brewer | ............... | A47J 37/0786 |
| 10,070,754 B2* | 9/2018 | Schlosser | ............ | A47J 37/0704 |
| 10,159,381 B2* | 12/2018 | Walters | ............... | A47J 37/0704 |
| 2003/0139133 A1* | 7/2003 | Hardy | ............... | F24F 7/10 |
| | | | | 454/290 |
| 2009/0308373 A1* | 12/2009 | Scott | ............... | A47J 36/06 |
| | | | | 126/25 R |
| 2013/0206850 A1* | 8/2013 | Erickson | ............ | A47J 37/0704 |
| | | | | 236/1 G |
| 2013/0225057 A1 | 8/2013 | Merritt | | |
| 2016/0255998 A1* | 9/2016 | Feng | ............... | A47J 37/0713 |
| 2017/0224157 A1* | 8/2017 | Rummel | ............ | A47J 37/0704 |
| 2017/0370592 A1* | 12/2017 | Bogazzi | ............... | F24B 1/028 |
| 2018/0263415 A1* | 9/2018 | Hackley | ............ | A47J 37/0704 |

* cited by examiner

TOP VENT ASSEMBLY FOR KAMADO GRILL

FIELD OF THE INVENTION

This invention relates to a new and improved top vent assembly that improves temperature control for a kamado-style grill.

BACKGROUND OF THE INVENTION

Outdoor cooking grills, both portable and non-portable, are well known and utilize charcoal, wood, propane or electricity to produce heat for cooking food, the food being positioned on a grating or within a container disposed above the heat source. The grills typically have a hinged or removable cover or lid, such that the grill can be utilized in a closed mode wherein the heat is retained within the grill and the food is exposed to heat on all sides, or in an open mode wherein only the underside of the food is exposed to heat. In the closed mode the temperature within the grill can easily reach 400-500 degrees F.

In most grills the cooking temperature is controlled solely by adjusting the heat source, e.g., removing or adding charcoal, increasing or decreasing the gas flow, etc., since the covers are only positionable in either a fully closed or fully open status. Other grills, such as for example kamado-type grills, typically comprising an egg-shaped body with a hinged, domed cover, have a small diameter chimney or opening positioned in the cover to allow heated air and smoke to escape from the interior of the grill. It is known to provide such chimneys with adjustable vented structures such that the amount of heated air escaping from the closed grill can be adjusted as desired.

Vented structures that are adjustable based on allowing air to flow out from vertical structures can create turbulence and resistance for escaping air, thus preventing the air temperature inside the grill from exceeding 650 degrees F. Such high temperatures are preferred by some grill users for enhanced cooking techniques. In order for vertically adjustable grills to reach 650 degrees F. or greater, the vented structure must be entirely removed from the grill chimney so that the chimney is completely open and air flow is unrestricted.

It is an object of this invention to provide an improved adjustable vented chimney cap assembly or device to effectively control temperature for kamado-type grills and to overcome the above problems of the prior art.

Numerous innovations have been provided in prior art that are adapted to a variety of outdoor chimney vent assemblies. Even though the existing systems may be suitable for the specific purposes to which they address, however, they would not be as suitable for providing optimal temperature control. Thus there is a need for an improved vent assembly.

SUMMARY OF THE INVENTION

A feature of the present invention is a top vent for kamado-type grills comprising a vented chimney cap that effectively controls temperature. The purpose of this top vent is to improve air flow control through the chimney to increase temperature ranges and control within the smoker by providing for air flow adjustment on the vertical and horizontal planes of the top vent simultaneously.

The vent may have a gasket to provide a friction attachment of the vent to the chimney and to make the grill waterproof and prevent mold when the grill is not in use. The vent is preferably made of aluminum though other suitable materials such as iron, steel, or other composites are also within the contemplation of the invention. The vent can only pivot or slide in one direction to ensure it does not open (so as to lose the air flow setting) when the grill cover is opened or tilted.

In view of the foregoing, it is therefore another object of the present invention to provide a vent for a chimney on an outdoor grill comprising a base, which has an open top and an open bottom. The base does not have vent openings, so gases can only pass through the open top and open bottom of the base member.

It is still another object of the present invention to provide a vent for a chimney on an outdoor grill comprising a cover portion, which is rotatably mounted onto the base portion so that the entire cap can be rotated on the horizontal plane thus opening the entire chimney. This allows for more direct air exit and higher temperatures.

It is further another object of the present invention to provide a vent for an outdoor chimney, wherein gaps between downwardly extending structures and upwardly extending structures of the cap are aligned, whereby rotation of a tab extension slides the downwardly extending structures and adjusts the size of the open area of the gaps on the vertical plane.

A further object of the present invention is to simultaneously adjust air flow on the vertical plane, horizontal plane, or both.

In accordance with one aspect of the present invention, a vent for an outdoor chimney comprises a base having an open top and an open bottom, wherein a gasket is disposed between the open bottom of the base and at least a portion of the chimney; a cap comprising a cover and a lower portion having a lower surface that rests atop the base, wherein space for gases to pass out of the cap is controlled by an interplay between a plurality of downwardly extending structures of the cover of the cap; and a plurality of upwardly extending structures of the lower portion of the cap, wherein the cap can be pivoted relative to the base about a pivot point which connects the cap to the base.

In another aspect of the invention, a vent for an outdoor chimney comprises a cylindrical base having an open top and an open bottom, wherein a gasket is disposed between the open bottom of the base and at least a portion of the chimney; a cylindrical cap comprising a cover and a lower portion having a lower surface that rests atop the base and the cover of the cap is mounted to the lower portion of the cap which is rotatable relative to the base, wherein space for gases to pass out of the cap is controlled by horizontally sliding and adjusting the size of the space between a plurality of downwardly extending structures of the cover of the cap; and a plurality of upwardly extending structures of the lower portion of the cap by rotating the cover, wherein the cap can be pivoted relative to the base about a pivot point formed by a screw which connects the cap to the base, so as to open the entire chimney.

In another aspect of the invention, the vent is made of aluminum.

In another aspect of the invention, the diameter of the cap is smaller than the diameter of the base.

In another aspect of the invention, the upwardly extending structures and the downwardly extending structures of the cap are inset away from the outer edge of the cap and the cylindrical side walls of the base.

In another aspect of the invention, the gasket is pliant and is made of felt.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION

The particular features and advantages of the invention as well as other objects will become apparent from the following description taken in connection with the accompanying drawings in which.

DETAILED DESCRIPTION OF THE PRESENT INVENTION

The following detailed description is merely exemplary in nature and is not intended to limit the described embodiments or the application and uses of the described embodiments. As used herein, the word "exemplary" or "illustrative" n "serving as an example, instance, or illustration," Any implementation described herein as "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rearward," "right," "forward," "vertical," "horizontal," and derivatives thereof shall relate to the invention as oriented in FIGS. 1-3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
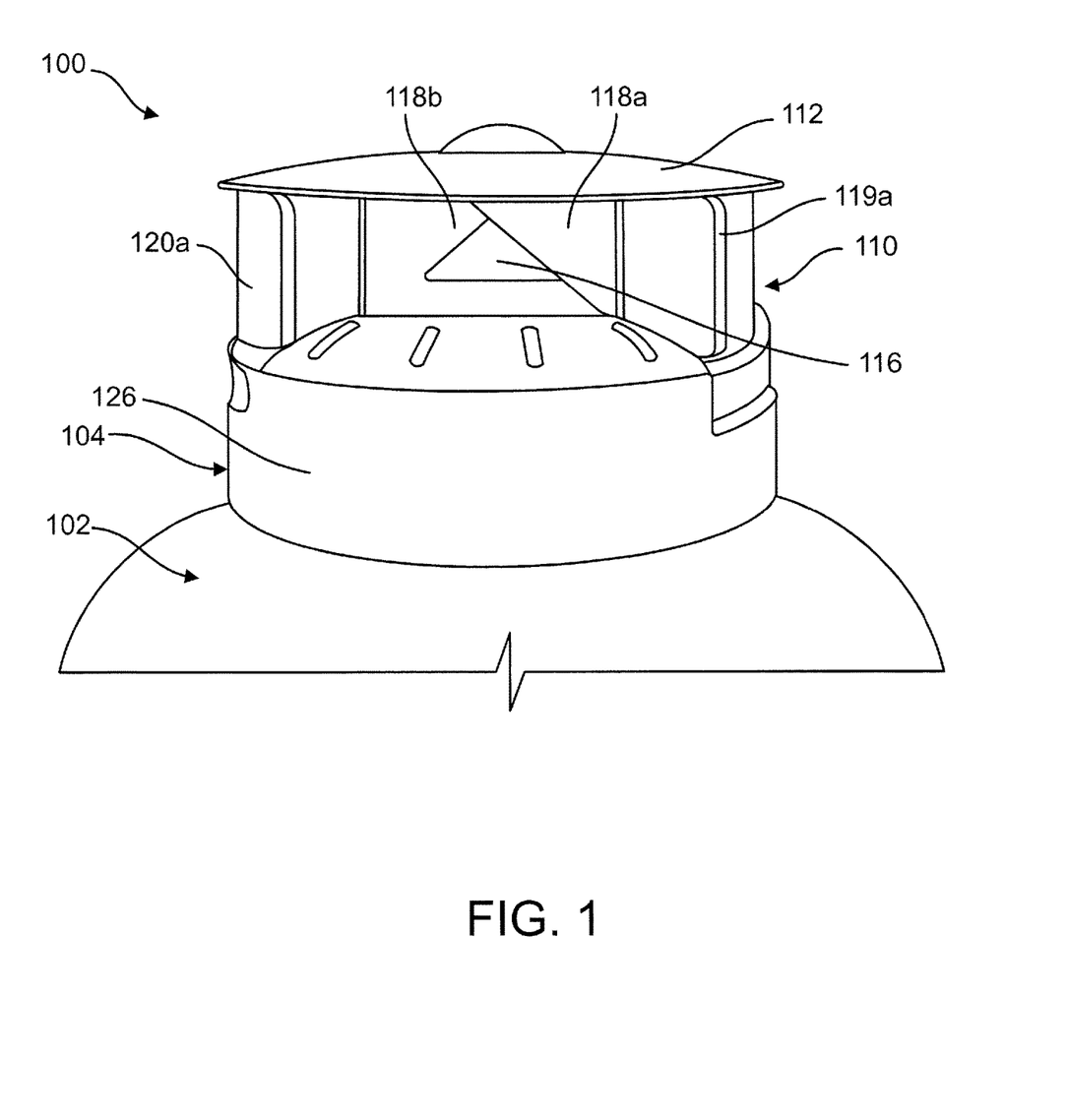
FIG. 1 illustrates a front view of an exemplary vent assembly attached to kamado-style grill.
Figure 2A:
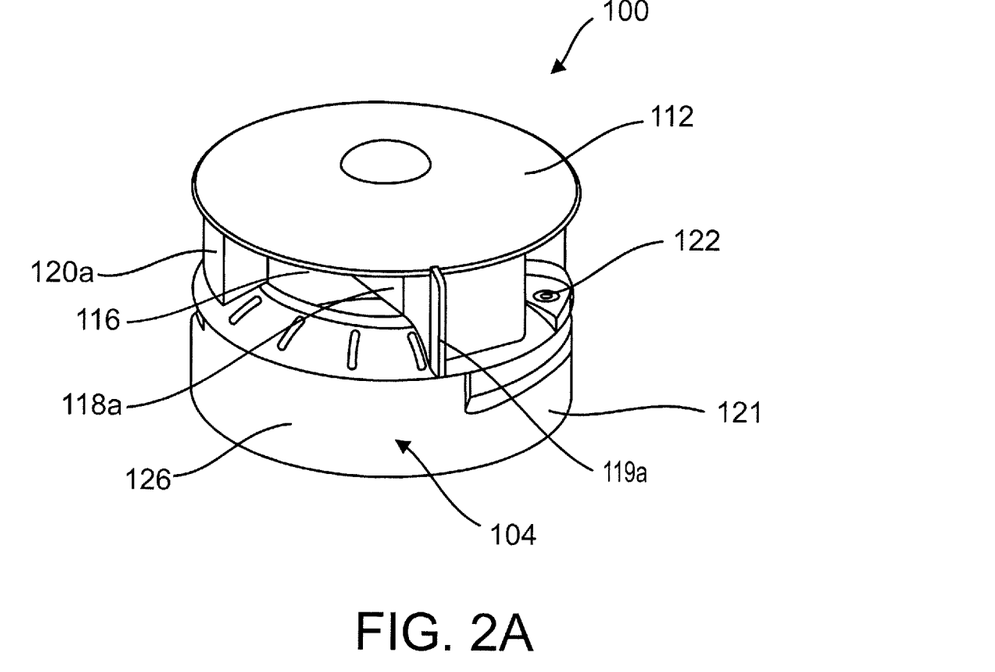
FIG. 2A illustrates a front perspective view of the vent assembly showing tabs positioned in a way, such that gaps are open to effectively control the air flow and temperature of the chimney.
Figure 2B:
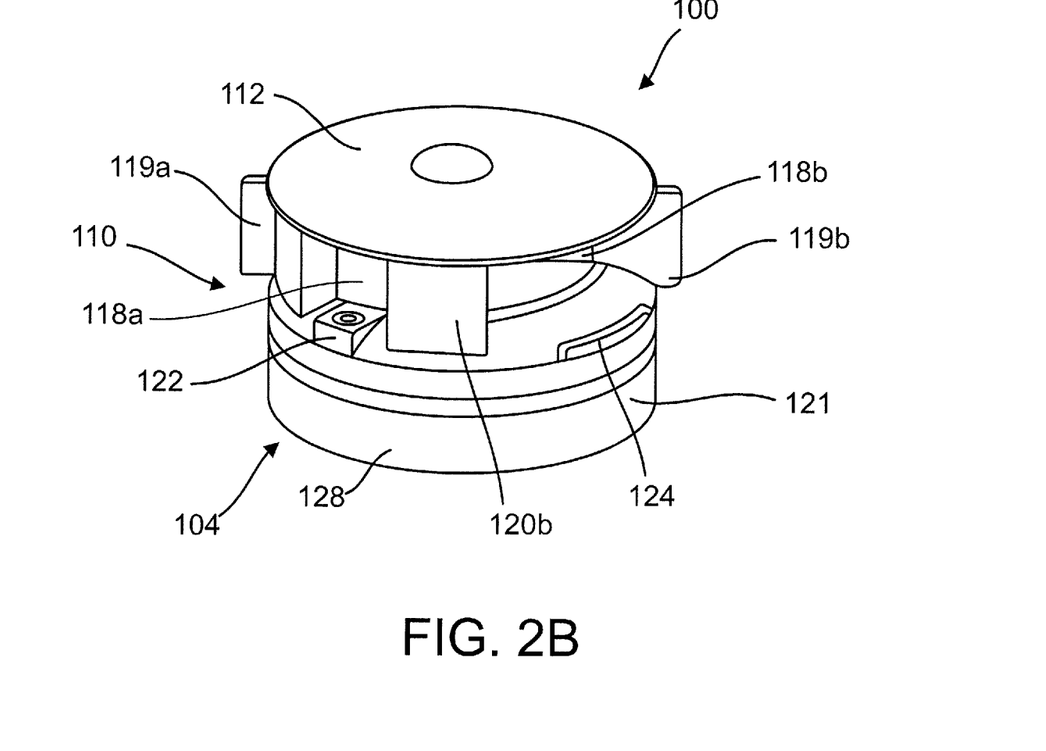
FIG. 2B illustrates a back perspective view of the vent assembly showing a stop arrangement at back of the vent.
Figure 2C:
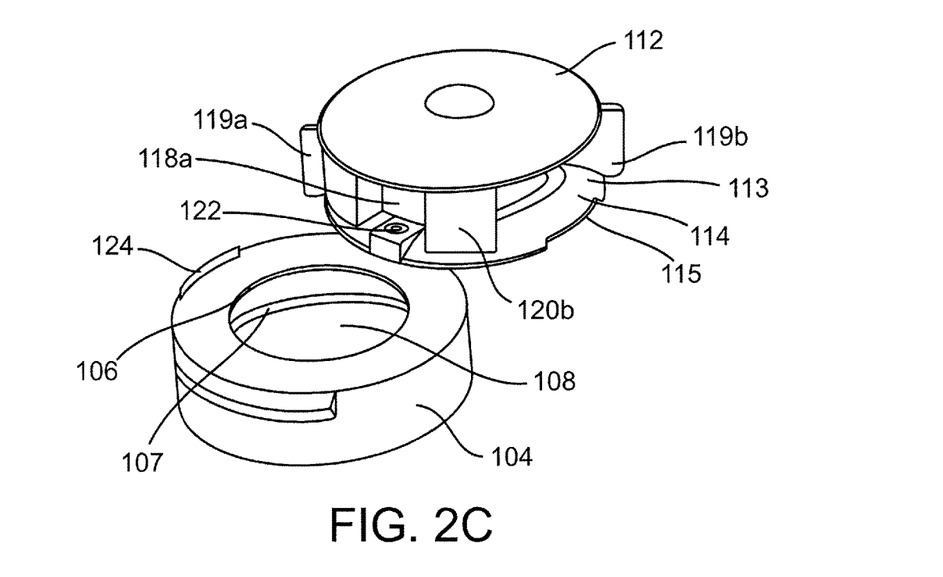
FIG. 2C illustrates a perspective view of the vent assembly showing the cap pivotable in one direction relative to the base about a pivot point which connects the cap to the base of the chimney.
Figure 3:
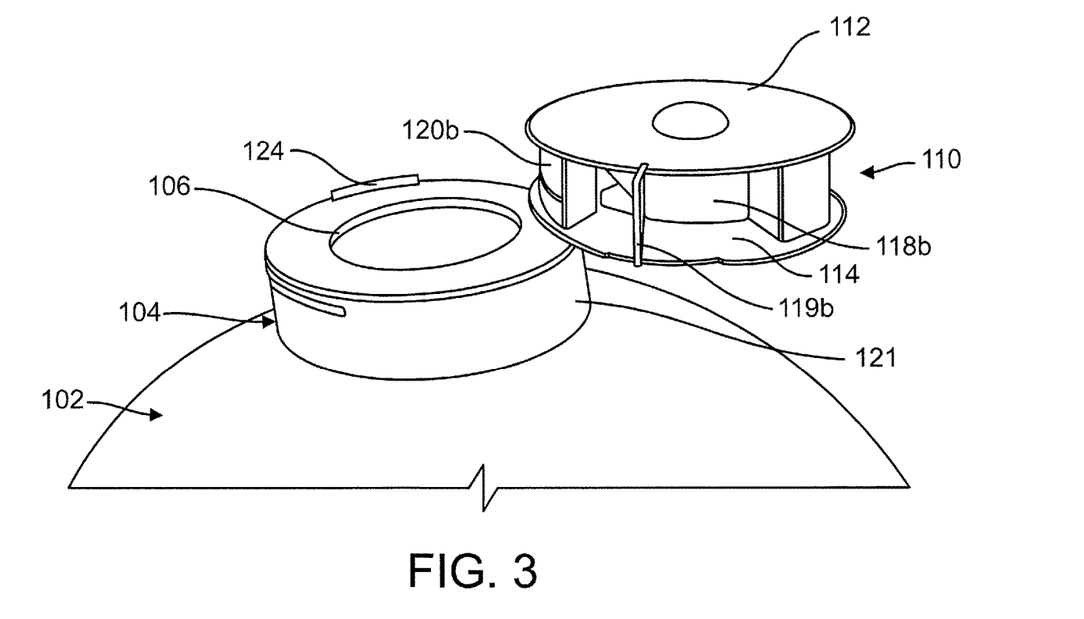
FIG. 3 illustrates a perspective view of the vent assembly attached to an outdoor chimney, showing the cap pivoted 180 degrees relative to the base, so as to completely open the chimney for more direct air exit and higher exhaust relief to the atmosphere, and where the tabs are positioned in a way, such that the gaps are at least partially closed.
Figure 4A:
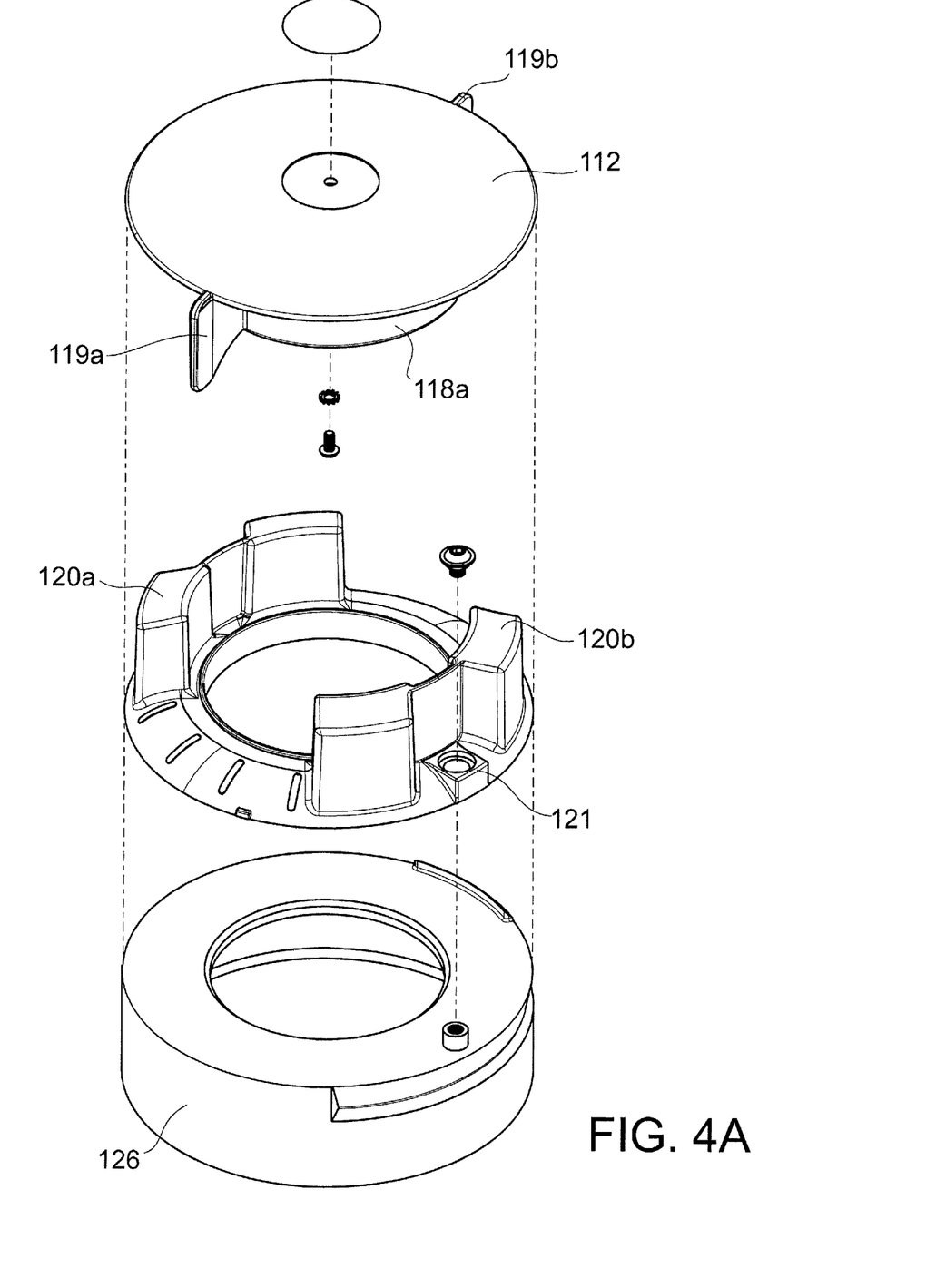
FIGS. 4A and 4B are exploded views of the vent assembly, in accordance with an embodiment of the present disclosure.
Figure 4B:
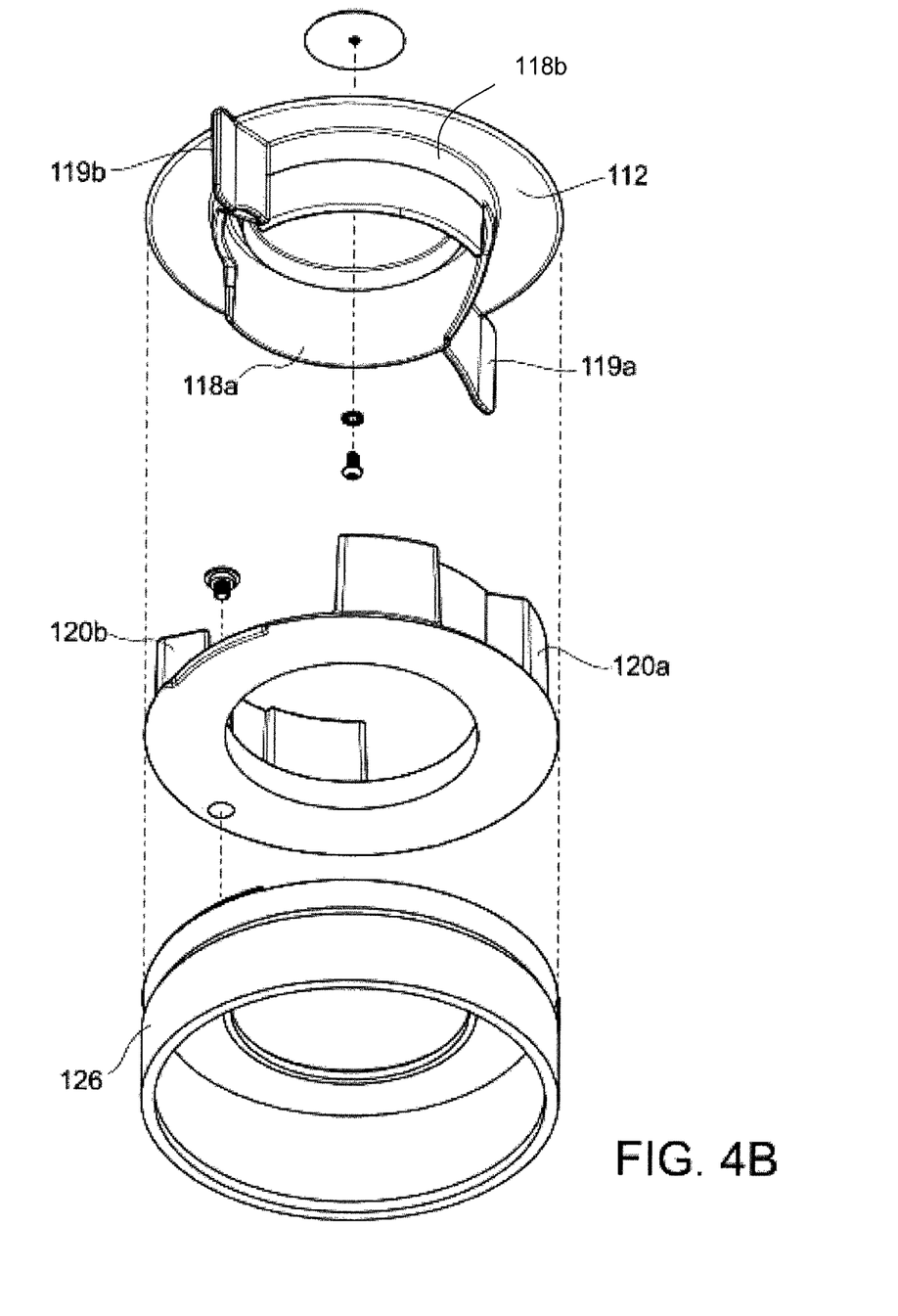

A vent 100 that controls temperature for kamado-style grills 102 is referenced in FIGS. 1-3. The purpose of this vent 100 is to effectively control the openings 108 and 116 for air exit, so as to improve air flow through the grill 102 to increase temperature ranges and control within the grill 102. The vent 100 may have a gasket 107 (shown in FIG. 2C) to secure the vent 100 by friction when the base 104 is placed about the chimney (not shown) and to make the grill 102 waterproof and prevent mold when the grill 102 is not in use. Preferably, the vent 100 can pivot or slide in only one direction to ensure it does not open completely, so as to lose the air flow setting when the grill cover 112 is opened or tilted.

As referenced in FIG. 1, the vent 100 for a chimney (not shown) such as for a kamado-style grill is attached to the top of the grill 102. The vent 100 comprises a base 104 and a cap 110. The base 104 of the vent 100 is generally cylindrical in shape, though the base can be formed to correspond and attach to any size or shape of chimney on the grill 102. The base 104 has an open top 106 and an open bottom 108. The base 104 does not have vent openings, so gases can only pass through the open top 106 and open bottom 108 of the base member 104. The open bottom 106 of the base 104 receives hot gases from the grill 102. The open bottom 108 of the base 104 is sized and shaped to receive a portion of the grill 102. Preferably, a gasket 107 secures the base 104 to the grill chimney (not shown) of the grill 102 by frictionally resisting removal of the base 104 from the grill 102. The gasket 107 is preferably pliant and is made of felt. The cap 110 is generally cylindrical in shape and comprises a cover 112 and a lower portion 114 having a lower surface 113 that rests atop the base member 104. While generally cylindrical, the cap 110 may also be shaped to correspond to the shape of the base 104, which corresponds to the shape of the chimney (not shown) of the grill 102. The cap 110 has a wall of rotating downwardly extending tab-like structures 118a and 118b for creating and controlling openings 116 for gases to pass out of the cap 110.

As referenced in FIG. 2A, the vent 100 of the present invention does not have openings in the wall. However, one or more openings 116 for gases to pass out of the cap 110 are formed by the interplay between at least one downwardly extending structure 118a and 118b of the cover 112 and at least one upwardly extending structure 120a and 120b of a lower portion 114 of the cap 110. The diameter of the cap 110 is smaller than the diameter of the base 104, As can be seen in the attached figures, the downwardly extending structures 118a and 118b of the cover 112 are inset away from the outer edge of the cover 112 and the tubular side walls 121 of the base 104. The front 126 of the base 104 has sufficient space for displaying logo or other indicia relating to the vent 100.

As referenced in FIG. 2B and FIG. 2C, the cover portion 112 of the cap 110 is placed on top of the upper surface 115 of the lower portion 114 of the cap 110 and the cover 112 is rotatable relative to the lower portion 114 and the base 104 for opening and closing the opening 116, but the cap 110 as a whole is not rotatable relative to the base 104. Instead, the cap 110 may be pivoted about a pivot point 122 positioned relative to the base 104. That pivot point is formed by a screw or other fastener such as a rivet, post, axel, bolt, etc. which connects the cap 110 to the base 104. Further a stop 124 located on the base 104 at the back 128 of the vent 100, which facilitates sliding of the cap 110 relative to the base 104 in one direction only. When properly oriented on the grill cover 112, this feature restricts accidental opening of the cap 110 in a horizontal direction when the ceramic cover 112 is opened.

The base 104 does not have vent openings in the walls 121 for exhaust gases when the cap 110 is closed on the horizontal plane. When the cap 110 is closed, gases travel from the grill, through the chimney into the open bottom 108 of the base 104, then out of the open top of the base into the cap 110 where the gasses escape through the opening 116 formed by the interplay between the upwardly extending structures 120a and 120b of the lower portion 114 of the cap 110 and the downwardly extending structures 118a and 118b of the cover 112 of the cap 110. The tabs 119a and 119b extending out from the downwardly extending structures 118a and 118b may be used to slide the cover 112 relative to the lower portion 114 to control the size of the openings 116, thereby facilitating control of the amount of gas able to pass out of the chimney (not shown). For example, by sliding the tab 119a in a clockwise direction, the opening 116 (as shown in FIG. 3), which is formed by the interplay between the upwardly extending structures 120 of the lower portion 114 of the cap 110 and the downwardly extending structures 118 of the cover 112 of the cap 110, can be closed to allow gasses remain in the chimney and open bottom of the base 108. The side walls of the cap 110 do not nest within the base 104. The side walls of the cap 110 rest entirely atop the base 104.

Those skilled in the art, in light of the present teachings, will recognize that different size and shape of the vent 100 and its elements can be used without any constraint to the type of material and without departing from the scope and spirit of the invention.

In an embodiment of the invention, the openings 116 between the upwardly extending structures 120a and 120b of the cap 110 are aligned whereby rotation of the tabs 119a or 119b as shown on the back 128 of the vent in FIG. 2B, slides at least one downwardly extending structure 118a or 118b clockwise and adjusts the size of the open area of the openings 116. FIGS. 2A-2C show downwardly extending structures 118a and 118b are positioned in a way, such that the openings 116 are open, thereby controlling the temperature of the grill 102 on the vertical plane.

In another embodiment of the invention, the cover portion 112 is rotatably mounted onto the base portion 104 so that the entire cover 112 can be pivoted thus opening the entire chimney of the grill 102, as shown in the FIG. 2C and FIG. 3. This allows for more direct air exit on the horizontal plane and higher temperatures in the grill cooking area. The base 104 does not have vent openings, however, gases can only pass through the open top 106 and open bottom 108 of the base 104 from the chimney (not shown). The cap 110 rests entirely atop the base portion 104 with the lower surface 113 of the lower portion 114 of the cap 110 slidably resting upon the upper surface 115 of the base 104. The side walls of the cap 110 do not nest within the base portion 104. The wall of upwardly extending structures 120a and 120b and downwardly extending structures 118a and 118 of the cap 110 are inset away from the outer edge of the cap 110 and the tubular side walls 121 of the base portion 104.

As illustrated in FIGS. 1-4B illustrating a vent 100 for a grill 102 comprising, a base 104 having an open top 106 and an open bottom 108; and a cover 112 and a lower portion 114 having a lower surface 113 that rests atop the base 104, wherein opening 116 for gas to pass out of the cover 112 is controlled by an interplay between a plurality of downwardly extending structures 118a and 118b of the cover 112 and a plurality of upwardly extending structures 120a and 120b of the lower portion 114 of the cover 112, wherein the cover 112 can be pivoted relative to the base 104 about a pivot point 122 which connects the cover 112 to the base 104.

In another exemplary embodiment of the invention, a vent 100 for an outdoor chimney for a grill 102 comprising, a cylindrical base 104 having an open top 106 and an open bottom 108, wherein a gasket 107 is disposed between the open bottom 108 of the base 104 and at least a portion of the chimney (not shown); and a cylindrical cover 112 and a lower portion 114 having a lower surface 113 that rests atop the base 104 and the cover 112 is mounted to the upper surface 115 of the lower portion 114 of the cover 112, wherein the cover 112 is rotatable relative to the base 104, wherein opening 116 for gases to pass out of the cover 112 is controlled by adjusting the size of the opening 116 between a plurality of downwardly extending structures 118a and 118b of the cover 112 and a plurality of upwardly extending structures 120a and 120b of the lower portion 114 of the cover 112 by rotating the cover 112, wherein the cover 112 can be pivoted relative to the base 104 about a pivot point 122 formed by a screw which connects the cover 112 to the base 104, so as to open the entire chimney of the grill 102.

In another embodiment of the invention, the vent 100 is made of aluminum. However other suitable material can be used without departing from the scope and spirit of the invention.

In another embodiment of the invention, the base 104 and cover 112 of the vent 100 are cylindrical in shape. However other suitable shape such as hexagonal, octagonal or the like can be used for the vent 100 and its elements without departing from the scope and spirit of the invention.

In some embodiments, the upwardly extending structures 120a and 120b and the downwardly extending structures 118a and 118b of the cover 112 are inset away from an outer edge of the cover 112 and a cylindrical side wall 121 of the base 104. Further the cover 112 does not have openings in the extending structures 120.

In another embodiment of the invention, the diameter of the cover 112 is smaller than the diameter of the base 104. However any suitable diameter of cover 112 and base 104 can be used for the vent 100 without departing from the scope and spirit of the invention.

In another embodiment of the invention, the gasket 107 is pliant and is made of felt or any other suitable flexible material without departing from the scope and spirit of the invention.

In another embodiment of the invention, the pivot point 122 is formed by a screw which connects the cover 112 to the base 104. However the pivot point 122 can be made by any known means in the prior art without departing from the scope and spirit of the invention.

In another embodiment of the invention, the upwardly extending structures 120a and 120b of the cover 112 slide adjust the size of the opening 116 between the extending structures (118a and 120a and 118b and 120b). However any similar arrangement to adjust opening 116 between the extending structures (118a and 120b and 118b and 120b) can be done without departing from the scope and spirit of the invention.

These and other scope and advantages of the invention will be further understood and appreciated by those skilled in the art by reference to the written specification, claims and appended drawings.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

I claim:

1. A vent for an outdoor chimney comprising:
   (a) a base having an open top and an open bottom; and
   (b) a cap coupled to the base, the cap comprising
      (i) a cover including two or more downwardly extending structures coupled to a bottom surface of the cover; and
      (ii) a lower plate having a lower surface that rests atop the base, the lower plate including two or more upwardly extending structures coupled to a top surface of the lower plate;
   wherein the downwardly extending structures and the upwardly extending structures define a space for gases to pass out of the cap; and
   wherein the downwardly extending structures comprise at least one tab extending outwardly from each downwardly extending structure and the at least one tab may be used to slide the cover causing the downwardly extending structures to move with respect to the lower plate such that the size of the space is controlled by an interplay between the downwardly extending structures and the upwardly extending structures.

2. The device of claim 1, wherein the vent is made of aluminum.

3. The device of claim 1, wherein the base is cylindrical in shape.

4. The device of claim 1, wherein the cap is cylindrical in shape.

5. The device of claim 1, wherein the cap does not have openings in the downwardly extending structures or the upwardly extending structures.

6. The device of claim 1, wherein diameter of the cap is smaller than the diameter of the base.

7. The device of claim 1, wherein the upwardly extending structures and the downwardly extending structures of the cap are inset away from an outer edge of the cap and a cylindrical side wall of the base.

8. The device of claim 1, wherein a gasket is disposed between the open bottom of the base and at least a portion of the outdoor chimney.

9. The device of claim 1, wherein the cover of the cap is mounted to the lower portion of the cap and the cover is rotatable relative to the base.

10. The device of claim 1, wherein a pivot point is formed by a screw which connects the cap to the base.

11. The device of claim 10, wherein the pivot point is disposed proximate an outer edge of the lower plate such that that cap can be pivoted to expose the open top of the base.

12. The device of claim 1, wherein the downwardly extending structures of the cap slide to align or adjust the size of the space between the upwardly extending structures.

13. A vent for an outdoor chimney comprising:
    (a) a cylindrical base in fluid communication with the outdoor chimney; and
    (b) a cylindrical cap in fluid communication with the base, the cylindrical cap comprising:
       i) a cover comprising a first plurality of structures extending downwardly from a bottom surface of the cover; and
       ii) a lower plate comprising a second plurality of structures extending upwardly from a top surface of the lower plate;
    wherein the second plurality of structures is disposed outwardly from the first plurality of structures, such that rotation of the cover with respect to the lower plate causes the first plurality of structures to open or close a vent aperture disposed between a first structure of the second plurality of structures and a second structure of the second plurality of structures; and
    wherein the cover is rotatable about a pivot point connecting the cover to the base and disposed proximate an outer portion of the base.

14. The device of claim 13, wherein the vent is made of aluminum.

15. The device of claim 13, wherein the diameter of the cap is smaller than the diameter of the base.

16. The device of claim 13, wherein the upwardly extending structures and the downwardly extending structures of the cap are inset away from an outer edge of the cap and a cylindrical side wall of the base.

17. The device of claim 13, wherein a gasket disposed between the open bottom of the base and at least a portion of the outdoor chimney.

* * * * *

UNITED STATES PATENT AND TRADEMARK OFFICE
CERTIFICATE OF CORRECTION

PATENT NO. : 10,602,879 B2
APPLICATION NO. : 15/390137
DATED : March 31, 2020
INVENTOR(S) : Brennan Page 1 of 1

It is certified that error appears in the above-identified patent and that said Letters Patent is hereby corrected as shown below:

In the Claims

Claim 6, Column 7, Lines 38-39:
Please replace "wherein diameter of the cap is smaller than the diameter of the base" with "wherein a diameter of the cap is smaller than a diameter of the base"

Claim 15, Column 8, Lines 37-38:
Please replace "wherein the diameter of the cap is smaller than the diameter of the base" with "wherein a diameter of the cap is smaller than a diameter of the base"

Claim 17, Column 8, Lines 43-45:
Please replace "wherein a gasket disposed between the open bottom of the base and at least a portion of the outdoor chimney" with "wherein a gasket is disposed between the open bottom of the base and at least a portion of the outdoor chimney"

Signed and Sealed this
Thirtieth Day of June, 2020

Andrei Iancu
*Director of the United States Patent and Trademark Office*